(12) United States Patent  
Buelow et al.

(10) Patent No.: US 8,956,006 B2  
(45) Date of Patent: Feb. 17, 2015

(54) ELONGATED LED LAMP FOR REPLACING A FLUORESCENT LAMP

(75) Inventors: Roger F. Buelow, Gate Mills, OH (US); Laszlo A. Takacs, Lakewood, OH (US); Keith D. Kazenski, Twinsburg, OH (US); Chris H. Jenson, Twinsburg, OH (US); Joseph G. Kaveski, Leawood, KS (US); John M. Davenport, Middleburg Heights, OH (US)

(73) Assignee: Energy Focus, Inc., Solon, OH (US)

( * ) Notice: Subject to any disclaimer, the term of this patent is extended or adjusted under 35 U.S.C. 154(b) by 472 days.

(21) Appl. No.: 13/216,229

(22) Filed: Aug. 23, 2011

(65) Prior Publication Data

US 2012/0044666 A1 Feb. 23, 2012

Related U.S. Application Data

(60) Provisional application No. 61/375,927, filed on Aug. 23, 2010.

(51) Int. Cl.  
*F21V 21/08* (2006.01)  
*H05B 33/08* (2006.01)

(52) U.S. Cl.  
CPC .................................. *H05B 33/0803* (2013.01)  
USPC .. 362/222; 362/311.02; 362/307; 362/217.14

(58) Field of Classification Search  
USPC ............... 362/222, 223, 328, 249.02, 311.01, 362/311.02, 307, 308, 309, 327, 551, 552, 362/555, 560, 559, 217, 217.02, 217.05, 362/217.14  
See application file for complete search history.

(56) References Cited

U.S. PATENT DOCUMENTS

| 5,406,641 | A | 4/1995 | Bigley, Jr. et al. |
| 5,485,541 | A | 1/1996 | Bigley, Jr. et al. |
| 5,848,831 | A | 12/1998 | Tatsumi |
| 6,139,174 | A * | 10/2000 | Butterworth .................. 362/555 |
| 6,304,693 | B1 | 10/2001 | Buelow, II et al. |
| 6,546,665 | B1 | 4/2003 | Eldredge et al. |
| 6,637,924 | B2 * | 10/2003 | Pelka et al. ................... 362/555 |

(Continued)

FOREIGN PATENT DOCUMENTS

| EP | 1 376 003 A1 | 1/2004 |
| EP | 1 850 426 A1 | 10/2007 |

(Continued)

*Primary Examiner* — Jong-Suk (James) Lee  
*Assistant Examiner* — Leah S Macchiarolo  
(74) *Attorney, Agent, or Firm* — Bruzga & Associates; Charles E. Bruzga (57) ABSTRACT

An elongated LED lamp suitable for replacing a fluorescent lamp in a lamp fixture comprises a chassis having a first chassis end with two electrodes adapted to be respectively coupled to two electrodes in the lamp fixture supplying AC power, and a second chassis end. A light source depends from the chassis. A power regulating circuit is mounted to the chassis and is coupled to the two electrodes for providing DC power to the first light source. A first light collector conditions the light it collects light from the first light source for TIR propagation within a side-light distribution arrangement. An elongated side-light distribution portion depends from the chassis and receives light exiting the first light collector. Light-extraction structure extract light from the side of the first portion, along a length of the first portion, in a different direction from the direction of light received from the first light collector.

19 Claims, 4 Drawing Sheets

(56) References Cited

U.S. PATENT DOCUMENTS

| | | |
|---|---|---|
| 6,671,432 B2 | 12/2003 | Imada |
| 6,726,341 B2 | 4/2004 | Pashley et al. |
| 6,739,734 B1 | 5/2004 | Hulgan |
| 6,783,269 B2 | 8/2004 | Pashley et al. |
| 6,910,783 B2 | 6/2005 | Mezei et al. |
| 7,083,298 B2 | 8/2006 | Pritchard et al. |
| 7,163,326 B2 | 1/2007 | Cassarly et al. |
| 7,164,819 B2 | 1/2007 | Jenson et al. |
| 7,168,862 B2 | 1/2007 | Qi et al. |
| 7,194,184 B2 | 3/2007 | Buelow, II et al. |
| 7,215,863 B1 | 5/2007 | Arenella et al. |
| 7,220,035 B2 | 5/2007 | Buelow, II et al. |
| 7,228,052 B1 | 6/2007 | Lin |
| 7,229,201 B2 | 6/2007 | Krupa et al. |
| 7,330,632 B1 | 2/2008 | Buelow, II et al. |
| 7,374,313 B2 | 5/2008 | Cassarly et al. |
| 7,478,936 B2 | 1/2009 | Chen |
| 7,549,783 B2 | 6/2009 | Cassarly et al. |
| 7,556,412 B2 | 7/2009 | Guillermo |
| 7,588,342 B2 | 9/2009 | Buelow, II et al. |
| 7,611,271 B2 | 11/2009 | Meis et al. |
| 7,635,201 B2 | 12/2009 | Deng |
| 7,670,040 B2 | 3/2010 | Park |
| 7,829,651 B2 | 11/2010 | Shiobara et al. |
| 7,845,838 B2 | 12/2010 | Kuo et al. |
| 7,936,129 B2 | 5/2011 | Gwisdall et al. |
| 8,002,448 B2 | 8/2011 | Chen |
| 8,348,488 B2 * | 1/2013 | Buelow et al. ................ 362/555 |
| 8,480,276 B2 * | 7/2013 | Frankiewicz et al. ......... 362/551 |
| 2001/0048603 A1 | 12/2001 | Ohuchi |
| 2003/0072147 A1 * | 4/2003 | Pashley et al. ................... 362/92 |
| 2004/0012959 A1 | 1/2004 | Robertson et al. |
| 2004/0156199 A1 | 8/2004 | Rivas et al. |
| 2005/0162101 A1 | 7/2005 | Leong et al. |
| 2005/0277321 A1 | 12/2005 | Shah |
| 2007/0211488 A1 | 9/2007 | Cassarly et al. |
| 2008/0174992 A1 | 7/2008 | Lin |
| 2008/0310181 A1 | 12/2008 | Gurevich et al. |
| 2009/0185392 A1 | 7/2009 | Krupa et al. |
| 2009/0213616 A1 | 8/2009 | Simon |
| 2009/0237954 A1 | 9/2009 | Goto et al. |
| 2010/0027259 A1 | 2/2010 | Simon et al. |
| 2010/0177532 A1 | 7/2010 | Simon et al. |
| 2010/0254155 A1 | 12/2010 | Domagala et al. |

FOREIGN PATENT DOCUMENTS

| | | |
|---|---|---|
| EP | 2 194 407 A1 | 6/2010 |
| WO | 2006/040572 A1 | 4/2006 |

* cited by examiner

ELONGATED LED LAMP FOR REPLACING A FLUORESCENT LAMP

FIELD OF THE INVENTION

The present invention relates to elongated LED lamps for replacing elongated fluorescent lamps.

BACKGROUND OF THE INVENTION

The use of fluorescent lighting is wide spread. Typical fluorescent lighting consists of long slender tubes, typically 4 feet (122 cm) long with a diameter of 1 inch (2.54 cm). This type of lighting typically has a poor color rendering index, making color differentiation by a person difficult. This lighting is not widely used in residential lighting due to the poor aesthetics created by the wavelength distribution of light output from the lamp. Many efforts have been made to utilize LEDs in lamps used to replace fluorescent tubes. Such LED-based replacement lamps provide advantages in that LEDs can be selected that provide color spectrum outputs that give superior color rendering and more aesthetically pleasing light.

One approach used in making LED-based fluorescent tube replacements is to create a large array of LEDs that fit within a cylindrical envelope defined by the dimensions of the fluorescent tube being replaced. Such devices may consist of 100 or more individual LEDs. However, the output is less desirable because the brightness created by each LED evokes a sense of glare from the fixture. Reducing the number of LEDs while increasing the brightness of each LED to maintain a desired light output level only exacerbates the sensation of glare, whereas reducing the size of the LEDs and increasing the number of LEDs increases the overall cost of the device.

A second approach for making an LED-based fluorescent tube replacement, as disclosed in relation to FIG. 38 of Cassarly et al. U.S. Pat. No. 7,374,313, is to use a pair of LED light sources, one at each end of a side-light distribution member. It would be desirable to go beyond the foregoing disclosure and provide a means for holding the side-light distribution member and LED light sources in place.

It would thus be desirable to provide an elongated LED lamp that can replace an elongated fluorescent lamp, while providing a pleasing color distribution of light without high brightness "glare" spots and providing means for holding the side-light distribution arrangement.

BRIEF SUMMARY OF THE INVENTION

In a preferred form, the invention provides an elongated LED lamp suitable for replacing a fluorescent lamp in a lamp fixture. The LED lamp comprises a chassis having a first chassis end with two electrodes adapted to be respectively coupled to two electrodes in the lamp fixture supplying AC power, and a second chassis end. A first light source depends from the chassis, comprises at least one LED, and is located more proximate the first chassis end than the second chassis end. A power regulating circuit is mounted to the chassis and is coupled to the two electrodes for providing DC power to the first light source. A first light-collection means has an inlet end that collects at least 25 percent of the light emitted by the first light source, and has an outlet end that directs over half of the light collected at the inlet end with an angular distribution different from that of the light when received at the inlet end. An elongated side-light distribution arrangement has a first portion depending from the chassis and is arranged to receive at least a majority of the light exiting the first ht-collection means, which light has an appropriate angular distribution for total internal reflection within the side-light distribution arrangement. The first portion comprises a rod with an elongated shape having a minimum cross-sectional dimension along a length of the first portion that exceeds 50 percent of the maximum cross-sectional dimension along such length. Light-extraction means extract light from the side of the first portion, along a length of the first portion, in a different direction from the direction of light received from the first light-collection means.

Beneficially, the foregoing elongated LED lamp can replace an elongated fluorescent lamp, while providing a pleasing color distribution of light without high brightness "glare" spots and providing means for holding the side-light distribution arrangement.

Further objects and advantages will become apparent in light of the following disclosure.

BRIEF DESCRIPTION OF THE DRAWINGS

In the following drawings, like reference numbers refer to like parts.

DETAILED DESCRIPTION OF THE PREFERRED EMBODIMENT

Figure 1:
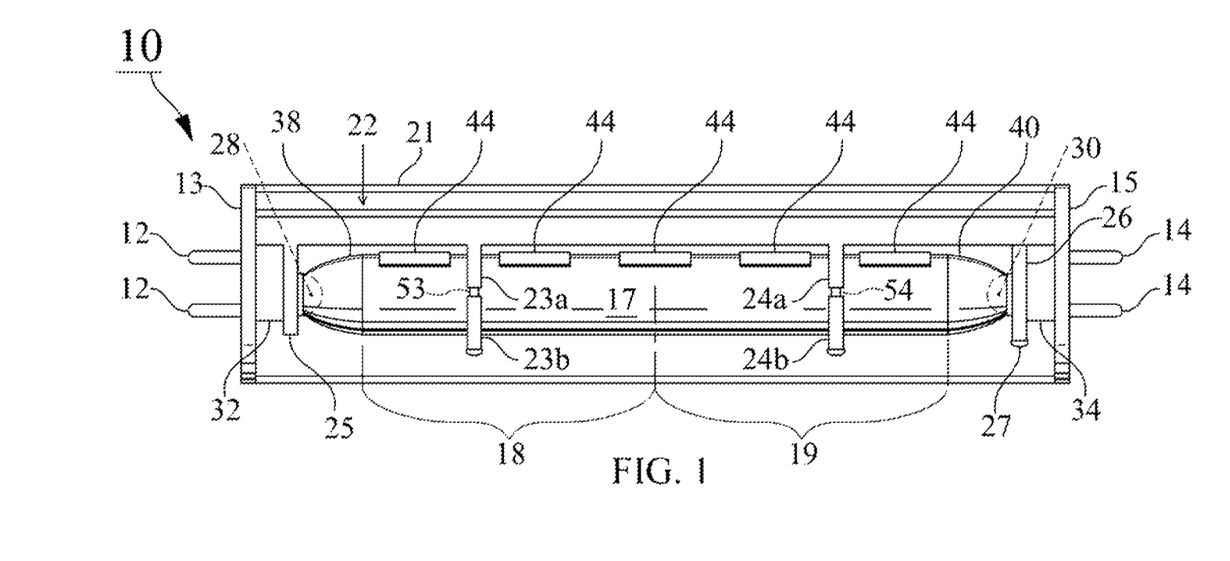
FIG. 1 is a side plan view of an elongated LED lamp, partially in diagrammatic form, in accordance with an aspect of the invention.
Figure 2:
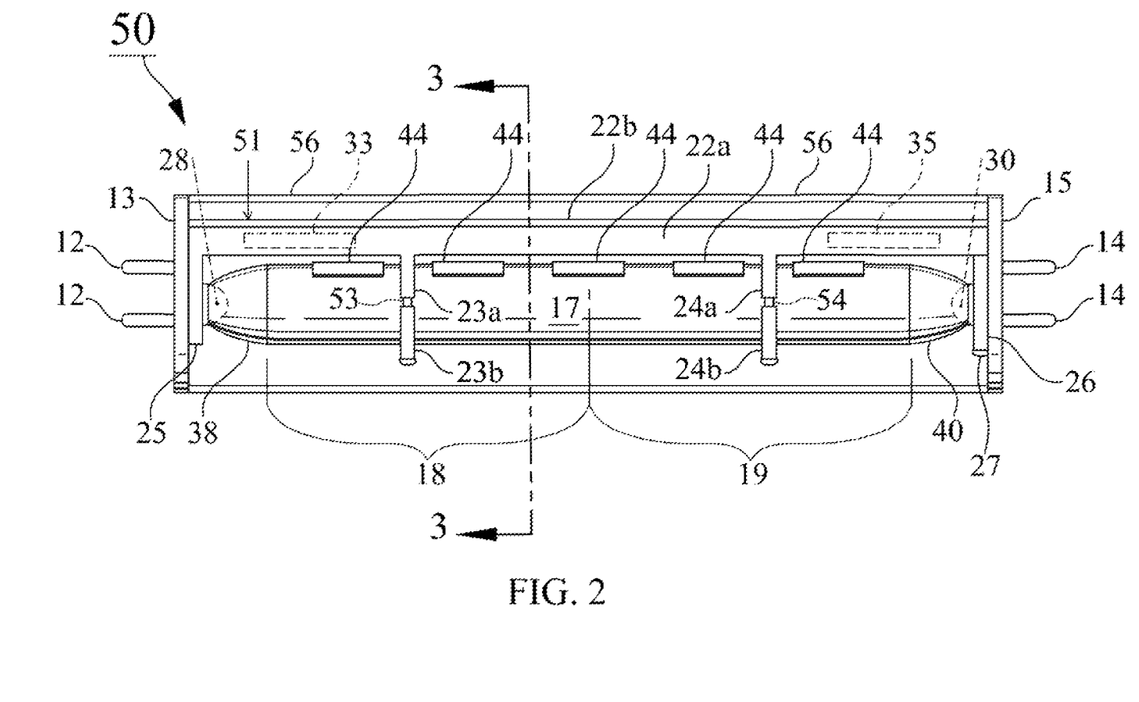
FIG. 2 is similar to FIG. 1, but has power regulating circuits for the LED light sources that are moved to different locations.
Figure 4:
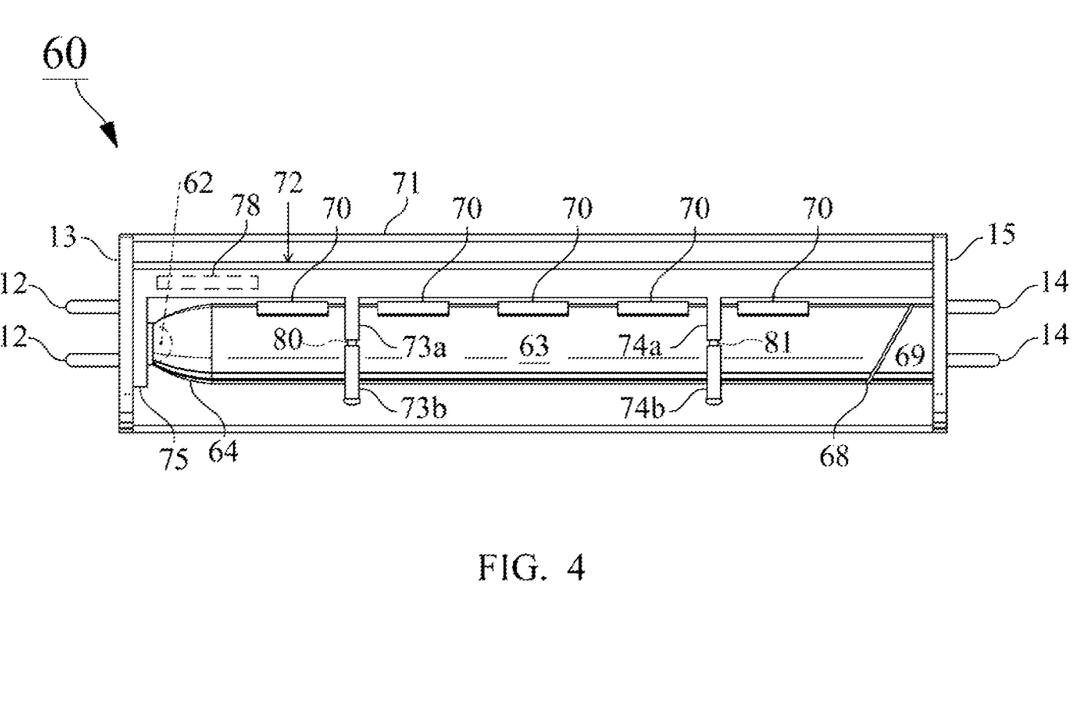
FIG. 4 is a side plan view of another elongated LED lamp, partially in diagrammatic form, in accordance with another aspect of the invention.

FIG. 1 shows an LED lamp 10 for replacing a fluorescent lamp in a fluorescent lamp fixture (not shown). Typical fluorescent lighting consists of long slender tubes, typically 4 feet (122 cm) long with a diameter of 1 inch (2.54 cm). However, FIG. 1, as well as FIGS. 2 and 4, illustrate lamps with a larger vertical size in relation to horizontal size than is typical, for clarity of illustration. LED lamp 10 includes a pair of electrode pins 12 and an associated end plate 13 at one end of the lamp, and another pair of electrode pins 14 and an associated end plate 15 at the other end of the lamp. Pins 12 and 14 are constructed to match electrode pins of a standard, elongated fluorescent lamp typically used for office lighting. In this way, the LED lamp 10 can replace a fluorescent lamp in a fixture (not shown) by simply removing the fluorescent lamp and replacing it with the LED lamp 10.

Chassis for Gripping and Protecting Illumination Portions of Lamp

LED lamp 10 includes a side-light distribution arrangement 17 with a first portion 18 and a second portion 19, which underlie and are preferably supported by a chassis 22 via downwardly depending brackets 23a, 23b and 24a, 24b. A pair of bolts, only one bolt 53 of which is shown in FIG. 1, join upper bracket portion 23a to lower bracket portion 23b and a pair of bolts, only one bolt 54 of which is shown in FIG. 1, join upper bracket portion 24a to lower bracket portion 24b. Chassis 22 and its brackets 23a, 23b and 24a, 24b preferably are formed of the following commonly used metals or plastics or metal-filled plastics: (1) an injection moldable or extrudable metal such as aluminum or zinc or (2) a resilient, injection moldable, or extrudable plastic material such TERLURAN-brand ABS (acrylonitrile/butadiene/styrene) resin from BASF USA of Florham Park, N.J., USA or DELRIN-brand acetal resin from E. I. Du Pont De Nemours and Company of Wilmington, Del., USA, or (3) Polyamide and polystyrene, available as injection-moldable resins from Cool Polymers, Inc., Headquarters, R&D, and Mfg., North Kingstown, R.I. USA. Heat sinks 25 and 26, preferably located at the first and second ends of side-light distribution arrangement 17, downwardly depend from chassis 22 and support respective LED light sources 28 and 30. In a preferred embodiment, heat sinks 25 and 26 each contain a respective depression (not shown) for receiving a respective LED light source 28 and 30.

LED light sources 28 and 30 preferably each comprises one or more LEDs, all of which are provided with (i) a single pair of power leads connected to respective pairs of electrode pins 12 and 14, (ii) a printed-circuit board, and (iii) a single lens for conditioning light output.

Chassis 22 provides strength for the illumination portions of the lamp 10, while providing material suitable for gripping, in the absence of a covering such as a transparent protective tube 21 by a user when installing, adjusting or removing the lamp 10 from a fluorescent light fixture (not shown). Transparent protective tube 21 may be made of, for instance, polycarbonate. Moreover, chassis 22 can incorporate aesthetic features, such as colors, shapes and decorative or other distinctive features.

Chassis 22 preferably is mounted to a fluorescent lamp fixture (not shown) by electrode pins 12 and 14. However, chassis 22 can be further secured to a fluorescent lamp fixture (not shown) by screws, magnets, or sturdy prongs, at each end of the chassis, in addition, or as an alternative to, the use of electrode pins 12 and 14.

Heat Sink for LED Light Sources 28 and 30

In one embodiment, especially when composed of a metal such as aluminum or zinc, chassis 22 can act as a heat sink for LED light sources 28 and 30, which tend to generate significant heat, which, if not quickly removed from the LED light sources, will significantly shorten their lifetime.

On-Board Power Regulating Circuit

Between end plate 13 and LED light source 28, a power regulating circuit 32, shown diagrammatically, converts AC power from electrodes (not shown) in a fluorescent lighting fixture, which engage electrode pins 12, to DC power with a preferably constant DC current. A similar power regulating circuit 34 may exist between LED light source 30 and end plate 15 for converting AC power received from pins 14 to suitable DC power for powering LED light source 30. In some embodiments, a single power regulating circuit can provide power to both LEDs 28 and 30. However, providing individual power regulating circuits 32 and 34 for LED light sources 28 and 30 allows more individualized control of the LEDs, whereby, for instance, LED light source 28 can be dimmed more than LED light source 30.

Light-Collection Means

The first portion 18 of side-light distribution arrangement 17 receives light from LED light source 28 through light-collection means 38. Similarly, the second portion 19 of side-light distribution arrangement 17 receives light from LED light source 30 via light-collection means 40. The first portion 18 of side-light distribution arrangement 17 may be physically joined to light-collection means 38, such as with index-matching optical adhesive, or by being integrally and gaplessly joined together with homogeneous material, such as would result from being formed together in the same mold.

Each of light-collection means 38 and 40 has an interiorly-directed reflective surface and is the primary device for receiving light from LED light sources 28 or 30 and, usually through a lens, transmitting that light toward a light-receiving portion (e.g., 18 and 19) of side-light distribution arrangement 17. Such reflective surface is typically specular if the light-collection means is hollow, or of the TIR-type if the light-collection means is solid (TIR meaning Total Internal Reflection).

Preferably, the rules of non-imaging optics govern the configuration of the light-collection means 38 and 40, at least approximately. As known in the art, the rules of non-imaging optics are concerned with the optimal transfer of light radiation between a source and a target. In contrast to traditional imaging optics, non-imaging techniques do not attempt to form an image of the source; instead an optimized optical system for optical radiative transfer from a source to a target is desired.

The two design problems that non-imaging optics solves better than imaging optics are as follows. First, (1) concentration, i.e., maximizing the amount of energy applied to the target (as in solar power, for instance, "collecting radiation emitted by high-energy particle collisions using the fewest number of photomultiplier tubes"). Second, (2) illumination, i.e., controlling the extraction of light, typically so it is "evenly" spread over some areas and completely blocked from other areas (as in automotive headlamps, LCD backlights, etc.).

Typical variables to be optimized at the target include the total radiant flux, the angular distribution of optical radiation, and the spatial extraction of optical radiation. These variables on the target side of the optical system often must be optimized while simultaneously considering the collection efficiency of the optical system at the source.

Typically, a light-collection means 38 or 40 at least approximately governed by the rules of non-imaging optics, has a profile that changes from inlet end towards outlet end to condition the angular distribution of light provided to a preferably rod-shaped side-light distribution arrangement 17. That is, as light propagates through the coupler 38 or 40, its angular distribution changes following at least approximately the rules of non-imaging optics. Three examples are as follows. First, (1) the light may be conditioned to reduce the angular distribution of light to be significantly below the numerical aperture or acceptance angle of the side-light distribution arrangement 17 so that it propagates along the entire length of arrangement 17 and is distributed out the opposite end. In this example, not applicable here, the arrangement does not distribute light from its side, so it is not called a side-light distribution arrangement. In a second example (2), the angular distribution of light leaving the coupler can be higher but closer, or even beyond, the numerical aperture (NA) of the distribution arrangement. In this case, the light leaving the coupler with a higher angular distribution will see a greater number of interactions with the sides of the side-light distribution arrangement 17, thereby increasing the opportunity for extraction out the side of arrangement 17 over a shorter distance. In a third example (3), the profile of the light-collection means 38 or 40 changes so that the light leaving the collection means is not only conditioned to cause the angular distribution to be within an intended NA, but also is conditioned to cause the light to be uniformly distributed among a greater number of angles. In this case, at least approximately governed by the rules of non-imaging optics, the profile of the collection means will typically grow in size and then decrease as it approaches and reaches the side-light distribution arrangement 17. Because the resulting light is conditioned so that light is present at a multitude of angles, light with higher angles will have more interactions with the side of the distribution arrangement and will be distributed over shorter distances, and light with lower angles will see fewer interactions so will be distributed over longer distances. The result can be a more uniform extraction out of the distribution arrangement along its entirety.

Preferably, each of light-collection means 38 and 40 have an inlet end that collects at least about 25 (and more preferably 75 and even more preferably 90) percent of the light emitted by the respective LED light sources 28 and 30, and has an outlet end that directs over half of the light collected at the inlet end with an angular distribution different from that of the light when received at the inlet end. The angular transformation is preferably chosen to attain a desired illumination profile along the length of the side-light distribution arrangement 17, which may be uniform to within about 10 percent of an average value of illumination, for instance.

Side-Light Distribution Arrangement

As mentioned above, the side-light distribution arrangement 17 preferably has the shape of an elongated rod. By "elongated" is meant being long in relation to width or diameter, for instance, where the "long" dimension can be both along a straight path or a curved path. The elongated rod has an elongated sidewall and light-extraction means 44 along at least part of the elongated sidewall for extracting light through the sidewall and distributing said light to a target area. At least that portion of the side-light distribution arrangement 17 having light-extraction means is preferably solid, although there may exist in the arrangement small voids caused by manufacturing processes, for instance, that have insubstantial impact on the side-light extraction and distribution properties of the arrangement. Although not shown, light-collection means 38 and 40 may be provided with light-extraction means (not shown).

A side-light distribution arrangement may comprise an acrylic rod, or high-temperature glass or quartz for operation in a heated environment, or other optically clear material such as the core of a large core, flexible, plastic, fiberoptic light guide.

A side-light distribution arrangement typically has a cross section along an axis of light propagation through the arrangement that is more round than flat. For instance, the minimum cross-sectional dimension is preferably more than 50% of the maximum cross-sectional dimension. In a preferred embodiment, the cross-section of the side-light distribution arrangement is substantially circular.

Preferably, a side-light distribution arrangement is rigid, by which is meant that at 20 degrees Celsius the arrangement has a self-supporting shape such that the arrangement returns to its original or approximately original (e.g., linear or curved) shape after being bent along a main path of light propagation through the arrangement.

Light-Extraction Means

Light-extraction means 44 may be of various types whose selection will be routine to those of ordinary skill in the art. For instance, three types of light-scattering means are disclosed in U.S. Pat. No. 7,163,326, entitled "Efficient Luminaire with Directional Side-Light Extraction," assigned to Energy Focus, Inc. of Solon, Ohio. In brief, these three types are (1) discontinuities on the surface of a side-light distribution arrangement, (2) a layer of paint on the surface of a side-light distribution arrangement, and (3) a vinyl sticker applied to the surface of a side-light distribution arrangement.

In more detail, (1) discontinuities on the surface of a side-light distribution arrangement may be formed, for instance, by creating a textured pattern on the distribution arrangement surface by molding, by roughening the distribution arrangement surface with chemical etchant, or by making one or more notches in the side of the distribution arrangement.

Secondly, (2) the light-extraction means could comprise a layer of paint exhibiting Lambertian-scattering and having a binder with a refractive index about the same as, or greater than that of, the core. Suitable light-extraction particles are added to the paint, such as titanium dioxide or many other materials as will be apparent to those of ordinary skill in the art. Preferably, the paint is an organic solvent-based paint.

Thirdly, (3) the light-extraction means could comprise vinyl sticker material in a desired shape applied to the surface of the distribution arrangement. Appropriate vinyl stickers have been supplied by Avery Graphics, a division of Avery Dennison of Pasadena, Calif. The film is an adhesive white vinyl film of 0.146 mm, typically used for backlit signs.

Generally, the light-extraction means may be continuous or intermittent or both along the length of a side-light distribution arrangement, for instance. An intermittent pattern is shown in the above-mentioned U.S. Pat. No. 7,163,326 in FIG. 15A, for instance. To assure that the light-extraction means appears as continuous from the point of view of the observer in a target area to be illuminated, the target area should be spaced from the side-light distribution arrangement in the following manner: the spacing should be at least five times the length of the largest gaps between adjacent portions of paint or other light-extraction means along the main path of TIR light propagation through the side-light distribution arrangement.

Additionally, the foregoing extractor patterns can be of the specular or scattering type, or a combination of both. Generally, a scattering extractor pattern for light on an elongated side-light distribution arrangement tends to provide light onto a target area, along the length of the distribution arrangement, with a moderate degree of directional control over the light in the length direction. In the direction orthogonal to the length, the scattering extractor pattern density and the cross sectional shape of the elongated distribution arrangement provide a smooth target distribution that is free of localized spatial structure but still provides good directional control. Scattering extractor patterns are relatively insensitive to fabrication errors.

In contrast, as used herein, a specular extractor pattern can provide light along the length of a side-light distribution arrangement with more localized control than can a scattering extractor pattern.

Light-extraction means 44 preferably extends along the length of first portion 18 of the side-light distribution arrangement 17 for a distance greater than 50 percent of the distance between first and second ends of the lamp 10 as defined by end plates 13 and 15. Preferably, the distance between the first and second ends of lamp 10 is at least about one foot (30.5 centimeters) long. Further, the LED light sources 28 and 30 are preferably each located within about five centimeters of the most adjacent end plates 13 or 15, with lamp 10 being free of further light sources located between the LED light sources 28 and 30.

In regard to the relationship between the first and second portions 18 and 19 of side-light distribution arrangement 17, such portions may be physically separate, or even optically isolated, from each other. Alternatively, first and second portions 18 and 19 may be optically coupled to each other, such as by being physically joined to each other, for instance, with index-matching optical adhesive, or by being integrally and gaplessly joined together with homogeneous material, such as would result from being formed together in the same mold. When portions 18 and 19 are optically coupled to each other, some light from LED light source 28 may pass through first portion 18 and enter portion 19 and become extracted by light-extraction means 44; and, similarly, some light from LED light source 30 may pass through second portion 19 and enter portion 18 and become extracted by light-extraction means 44.

On-Board Storage of Electrical Circuits, Etc.

Figure 3:
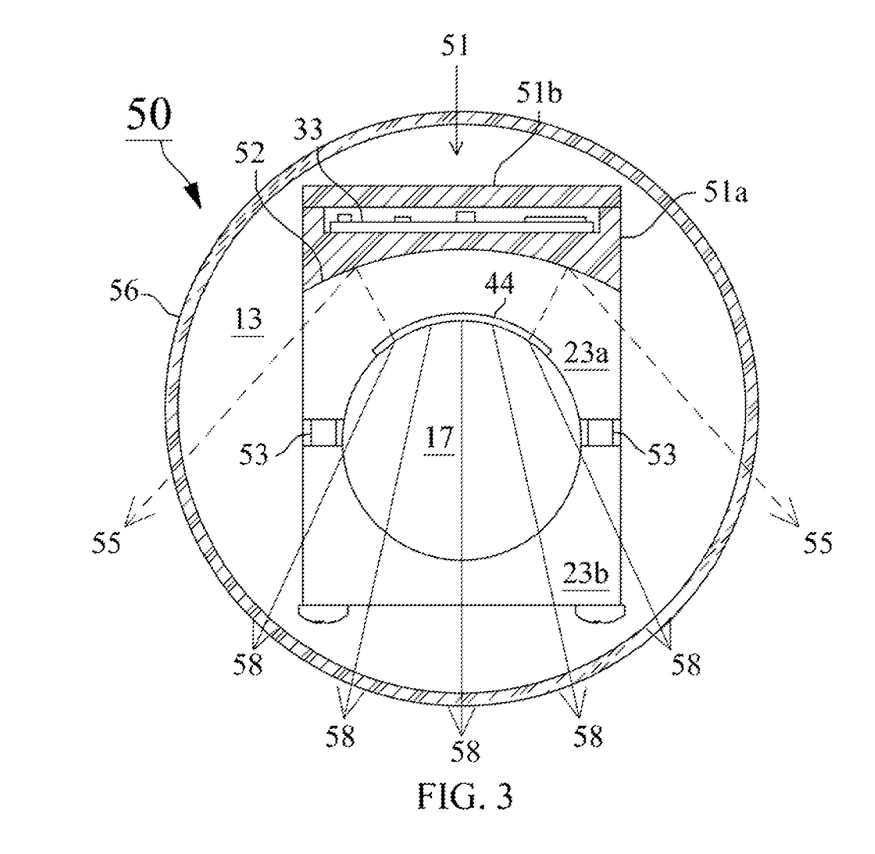
FIG. 3 is a cross-sectional view of an LED lamp taken at arrows 3 in FIG. 2, which is enlarged to more clearly show preferred details of construction.

FIG. 2 is similar to FIG. 1, but shows a lamp 50 whose power regulating circuits 32 and 34 of FIG. 1 are moved to locations 33 and 35, respectively, within chassis 51. If desired, a single power regulating circuit 33 or 35 may power both LED light sources 28 and 30. The preferred construction of chassis 51 is similar to that of chassis 51 shown in FIG. 3, wherein a chassis body section 51a is provided with a chassis cover 51b for enclosing an interior volume that can hold, for instance, power regulating circuit 33, shown as a printed-circuit board with electrical components mounted thereon. A protective tube 56, corresponding to protective tube 21 of FIG. 1, protects components within the tube. FIG. 3 shows cross sections for chassis body section 51a and chassis cover 51b representing plastic (e.g., polymer) or, alternatively, all metal or all plastic, as described elsewhere in this specification.

Other electric circuits that may be stored in the interior volume of chassis 51 are other printed-circuit boards ballasts, drivers, communication devices, wireless radio devices, sensors, controllers or any other device that can enhance the performance of LED lamp 10. For instance, a wireless radio device (not shown) stored in chassis 51 may be responsive to an occupancy sensor, for instance, so as to turn down or off the LED light sources 28 and 30 when an illuminated space is not occupied by a person. Further, for instance, a controller (not shown) stored in chassis 51 may consist of circuitry to allow for dimming of lights, turning off one or the other LED sources individually if there is one or more LED source at each end of lamp 10, or dimming one or the other LED light sources at the ends especially if the LED light sources have different color or efficiency qualities.

Especially when composed of aluminum, zinc or another metal-filled polymer such as polyamide and polystyrene, available as injection-moldable resins from Cool Polymers, Inc., Headquarters, R&D, and Mfg., North Kingstown, R.I. USA, chassis 51 can act also as a heat sink for electronic components stored in the interior volume formed in chassis 51.

Support of Side-Light Distribution Arrangement 17 and LED Light Sources 28 and 30

As mentioned above, chassis 22 or 51 supports side-light distribution arrangement 17 with its downwardly depending brackets 23a, 23b and 24a, 24b, for instance, relative to electrode pins 12 and 14 shown in FIG. 2, and also supports heat sinks 25 and 26 with LED light sources 28 and 30 preferably partially mounted into respective depressions (not shown) in heat sinks 25 and 26. It is advantageous for chassis 22 or 51 to support arrangement 17 and LED light sources 28 and 30 in this manner since arrangement 17 can be securely held in alignment with respect to LED light sources 28 and 30. More particularly, the LED light sources 28 and 30 may be held in a single position relative to chassis 22 or 51, and side-light distribution arrangement 17 may be similarly held in a single position relative to chassis 22 or 51. The chassis 22 or 51 then assures proper alignment between LED light sources 28 and 30 and side-light distribution arrangement 17.

Reflector for Capturing and Redirecting Otherwise Lost Light

Preferably, chassis 51 of FIG. 2 has a downwardly facing, elongated reflector 52, whose horizontal dimension in FIG. 3 is at least about 1.3 times the horizontal dimension of side-light distribution arrangement 17 as viewed in FIG. 3. Reflector 52 is supported by the chassis, as an integral or attached device, and faces the side-light distribution arrangement 17. Reflector 52 is preferably a non-specular, diffuse reflector. One purpose of reflector 52 is to capture light 55 that is extracted from side-light distribution arrangement 17 but, instead of passing downwardly through the lower surface of side-light distribution arrangement 17 as does downwardly directed light 58, first passes upwardly through light-extraction means 44. The light 55 that passes upwardly through light-extraction means 44 may typically be as much as 30 to 40 percent of the downwardly directed light 58, and would otherwise be lost unless efficiently captured and redirected by reflector 52, for instance. The reflector 52 thus significantly improves efficiency of extraction of light from side-light distribution arrangement 17. Chassis Si also preferably has the foregoing features of chassis 22.

FIG. 4 shows another elongated LED lamp 60, in which one or more LED light sources 62, comparable to LED light sources 28 or 30 described above, are used to provide light to a side-light distribution arrangement 63, via a light-collection means 64, comparable to light-collection means 38 and 40 described above. Side-light distribution arrangement 63 is comparable to side-light distribution arrangement 17 described above, except for its right-hand end not being provided with light from LED light sources near the right-hand end. Rather, the right-hand end of side-light distribution arrangement 63 may terminate with a reflector 68 for capturing light travelling from LED light source 62 to the right in side-light distribution arrangement 63, which is not extracted from the side of side-light distribution arrangement 63 by light-extraction means 70. Reflector 68 is preferably oriented as shown in FIG. 4 so as to direct captured light that is re-directed to the left, as shown, upwardly in light-distribution arrangement 63, so that the light will reach light-extraction means 70, comparable to light-extraction means 44 described above, and be extracted from the side of arrangement 63. A mechanical support member 69, which does not receive light from LED light source 62, can be used to support the right-hand shown end of side-light distribution arrangement 63. Alternatively, reflector 68 could be omitted, and side-light distribution arrangement 63 could extend all the way to end plate 15, for instance. A protective tube 71, corresponding to protective tube 21 of FIG. 1, protects components within the tube.

In FIG. 4, chassis 72, comparable to chassis 22 described above, has downwardly depending brackets 73a, 73b and 74a, 74b, comparable to brackets 23a, 23b and 24a, 24b described above, for supporting side-light distribution arrangement 63. A pair of bolts, only one bolt 80 of which is shown in FIG. 4, join upper bracket portion 73a to lower bracket portion 73b and a pair of bolts, only one bolt 81 of which is shown in FIG. 4, join upper bracket portion 74a to lower bracket portion 74b. A heat sink 75, comparable to heat sink 25 described above, preferably located at the first end of side-light distribution arrangement 63, downwardly depends from chassis 72 and supports respective LED light source 62. In a preferred embodiment, heat sink 75 contains a respective depression (not shown) for receiving a respective LED light source 62.

In LED lamp 60 of FIG. 4, only electrode pins 12 receive electrical power for LED light source 62, via a power regulating circuit 78 contained in an' interior volume of chassis 72, in the same manner as shown in FIG. 3 for power regulating circuit 33 contained in an interior volume of chassis 22. Alternatively, power regulating circuit 78 could be positioned between LED light source 62 and electrode pins 12, in the same manner as, in FIG. 1, power regulating circuit 32 is positioned between LED light source 28 and electrode pins 12.

The following is a list of reference numerals and associated parts as used in this specification and drawings:

REFERENCE NUMERAL PART

10 Elongated LED lamp
12 Electrode pins
13 End plate
14 Electrode pins
15 End plate
17 Side-light distribution arrangement
18 First portion of side-light distribution arrangement
19 Second portion of side-light distribution arrangement
21 Protective tube
22 Chassis
23a Upper portion of bracket
23b Lower bracket of bracket
24a Upper portion of bracket
24b Lower portion of bracket
25 Heat sink
26 Heat sink
28 LED light source
30 LED light source
32 Power regulating circuit
33 Power regulating circuit
34 Power regulating circuit
35 Power regulating circuit
38 Light-collection means
40 Light-collection means
44 Light-extraction means
50 Elongated LED lamp
51 Chassis
51a Chassis body portion
51b Chassis cover
52 Reflector
53 Bolt
54 Bolt
55 Light
56 Protective tube
58 Light
60 Elongated LED lamp
62 LED light source
63 Side-light distribution arrangement
64 Light-collection means
68 Reflector
69 Mechanical support member
70 Light-extraction means
71 Protective tube
72 Chassis
73a Upper portion of bracket
73b Lower portion of bracket
74a Upper portion of bracket
74b Lower portion of bracket
75 Heat sink
78 Power regulating circuit
80 Bolt
81 Bolt The foregoing describes an elongated LED lamp that is suitable for replacing a fluorescent lamp in a fluorescent lamp fixture. The lamp includes a chassis having benefits ranging from allowing an installer, in the absence of an outer protective tube, to grip the lamp while protecting illumination portions of the lamp, serving as a heat sink for one or more LED light sources in one embodiment, and providing an enclosed compartment for inclusion of various electrical circuits such as a power regulating circuit for an LED light source and a wireless circuit dimming the lamp when no person occupies an illuminated space.

While the invention has been described with respect to specific embodiments by way of illustration, many modifications and changes will occur to those skilled in the art. For instance, such directionally dependent terms as "downwardly," "top," etc., are used herein merely for ease of explanation and not in a limiting sense. It is, therefore, to be understood that the appended claims are intended to cover all such modifications and changes as fall within the true scope and spirit of the invention.

What is claimed is:

1. An elongated LED lamp suitable for replacing a fluorescent lamp in a lamp fixture, comprising:
    a) a elongated chassis having a first chassis end associated with two electrodes that are adapted to be respectively coupled to two electrodes in the lamp fixture supplying electrical power, and a second chassis end;
    b) a first light source depending from the chassis, comprising at least one LED, and being located more proximate said first chassis end than said second chassis end;
    c) a side-light distribution arrangement for receiving light from the first light source via a first light-collection means; the side-light distribution arrangement being elongated;
    d) the first light-collection means having an inlet end that collects at least 25 percent of the light emitted by the first light source, and having an outlet end that directs over half of the light collected at the inlet end to the side-light distribution arrangement; the first light-collection means having a profile that changes from inlet end to outlet end so as to
        i) condition angular distribution of light passing through said outlet end to be different from angular distribution of the light collected at the inlet end; and
        ii) render the light passing through said outlet end appropriate for total internal reflection within the side-light distribution arrangement; and
    e) the side-light distribution arrangement having a first portion depending from the chassis and being arranged to receive at least a majority of the light exiting the first light-collection means; the first portion comprising:
        i) a solid rod with an elongated shape having a minimum cross-sectional dimension along a length of the first portion that exceeds 50 percent of the maximum cross-sectional dimension along said length; and
        ii) light-extraction means for extracting light from a side of the first portion, along a length of the first portion, in a different direction from the direction of light received from the first light-collection means.

2. The lamp of claim 1, wherein the light-extraction means extends along a length of the first portion of the side-light distribution arrangement for a distance greater than 50 percent of the distance between the first and second ends of the lamp.

3. The lamp of claim 1, wherein the first light source comprises one or more LED light sources, all of which are provided with a single pair of power leads and a single lens for conditioning the light output.

4. The lamp of claim 1, wherein the chassis contains an elongated cavity extending along a length of the chassis for containing electronic elements.

5. The lamp of claim 4, wherein said cavity includes a power regulating circuit mounted to the chassis and coupled to said two electrodes for providing DC power to the first light source.

6. The lamp of claim 1, wherein:
   a) the chassis supports an elongated reflector facing the side-light distribution arrangement and shaped to partially surround said side-light distribution arrangement about a longitudinal axis of the side-light distribution arrangement; and
   b) the reflector facing the side-light distribution arrangement with a non-specular, reflecting surface that is configured to reflect light, extracted from the side-light distribution arrangement by the light-extraction means, to a desired target area to be illuminated.

7. The lamp of claim 6, wherein the cross-sectional width of said reflecting surface facing the first portion of the side-light distribution arrangement, taken along said longitudinal axis of said first portion of the side-light distribution arrangement, being at least about 1.3 times the maximum cross-sectional width of the first portion of the side-light distribution arrangement taken in the same plane as the cross-sectional width of said reflecting surface.

8. The lamp of claim 1, wherein the distance between the first and second chassis ends is at least about 30.5 centimeters.

9. The lamp of claim 1, wherein the first light-collection means has an input that collects at least 75 percent of the light emitted by the first light source.

10. The lamp of claim 1, wherein the second chassis end has two electrodes that are adapted to be respectively coupled to electrodes in the lamp fixture supplying electrical power; and further comprising:
   a) a second light source comprising at least one LED light source located more proximate said second chassis end than first second chassis end; and
   b) a second light-collection means and an associated second portion of the side-light distribution arrangement comprising the same features as the features of the first light-collection means and the first portion of the side-light distribution arrangement, respectively, as defined in claim 1.

11. The lamp of claim 10, wherein the first and second light sources are located within about five centimeters of the first and second chassis ends, respectively.

12. The lamp of claim 11, wherein the lamp is free of further light sources located between the first and second light sources.

13. The lamp of claim 10, wherein:
   a) light from the first light source passes through a distal end of the first portion of the side-light distribution arrangement and passes into the second portion of the side-light distribution arrangement; and
   b) light from the second light source passes through a distal end of the second portion of the side-light distribution arrangement and passes into the first portion of the side-light distribution arrangement.

14. The lamp of claim 10, wherein the first and second portions of the side-light distribution arrangement are optically isolated from each other.

15. The lamp of claim 10, wherein the first and second portions of the side-light distribution arrangement are optically coupled to each other.

16. The lamp of claim 10, wherein a power regulating circuit is mounted to the chassis for providing DC power to the second light source.

17. The lamp of claim 16, wherein said power regulating circuit for providing power to the second light source is the same as said power regulating circuit for providing power to the first light source.

18. The lamp of claim 1, wherein a majority of the length of the side-light distribution arrangement is spaced from the chassis.

19. The lamp of claim 1, wherein a power regulating circuit is mounted to the chassis and coupled to said two electrodes for providing DC power to the first light source.

* * * * *